June 8, 1965 C. U. BOUTIN 3,188,019
SIMPLIFIED INERTIAL GUIDANCE SYSTEM
Filed Dec. 16, 1960 2 Sheets-Sheet 1

*INVENTOR.*
CHARLES U. BOUTIN
BY
Allen Rottenberg
ATTORNEY

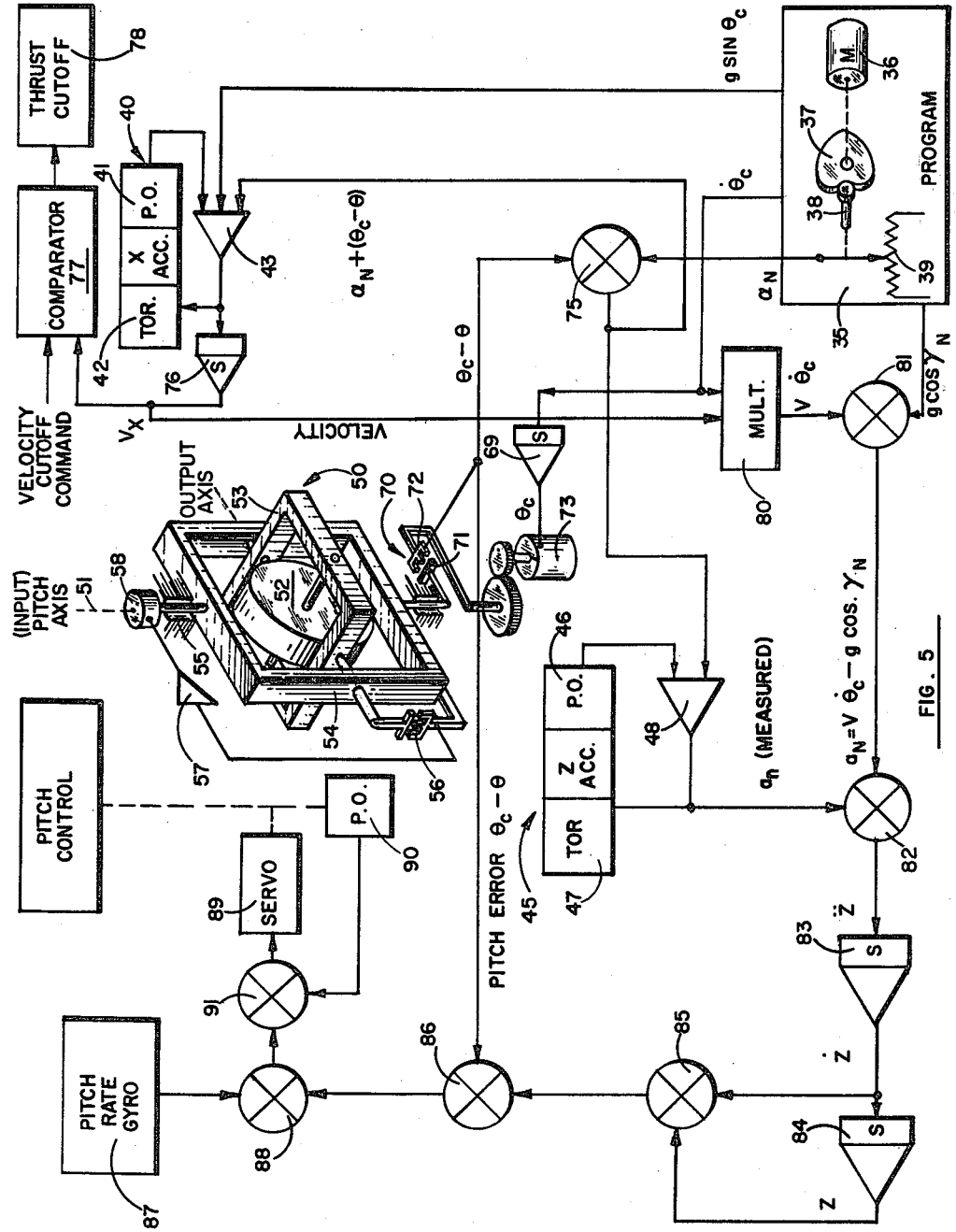

United States Patent Office 3,188,019
Patented June 8, 1965

3,188,019
SIMPLIFIED INERTIAL GUIDANCE SYSTEM
Charles U. Boutin, Tucson, Ariz., assignor to
North American Aviation, Inc.
Filed Dec. 16, 1960, Ser. No. 76,410
8 Claims. (Cl. 244—14)

This invention relates to a guidance system based upon the sensing of acceleration, and more particularly concerns such a system wherein the acceleration sensing instruments are fixedly related to the vehicle which carries the instruments.

As described in a co-pending application Serial No. 644,191 of John M. Slater et al., filed March 4, 1957, for Inertial Guidance System Using Vehicle Fixed Inertial Elements, the conventional gimbaled platform upon which the acceleration sensing instruments are mounted embodies a number of disadvantages. Among these disadvantages are included the exceeding mechanical complexity of the three degrees of freedom gimbaled system and the necessary use of a platform coordinate system which is different from the coordinate system of the vehicle and is angularly shiftable with respect to the vehicle. In order to avoid these and other disadvantages of a stable platform the apparatus of the co-pending application of Slater et al. employs a system wherein the sensing elements, the acceleration sensitive devices, together with sensing gyros, are fixedly mounted to the vehicle. Errors in the outputs of these sensing instruments which are caused by the combined rotational and translational velocities experienced by the vehicle and the instruments affixed thereto are computed in detail and utilized to suitably correct the desired acceleration instrument outputs. The computing apparatus required for this operation is necessarily complex whereby, for some situations, the simplicity afforded by securing the instruments to the vehicle and the advantages thereof are not warranted.

An arrangement for achieving a much simplified correction of the errors in vehicle fixed acceleration sensitive devices is described in my co-pending application Serial No. 730,753, filed April 21, 1958, for Internally Stabilized Inertial Instrument. This application describes a system wherein each vehicle fixed acceleration sensitive device has its proof mass servoed to align itself with a reference orientation which is fixed by a gyroscope. The arrangement is such that the accelerometer output indicates acceleration in the reference direction despite angular perturbation of the instrument and its supporting vehicle. However, even in the arrangement described in my co-pending application there are errors which remain uncorrected when the instruments are affixed to the vehicle.

In particular a problem not accounted for adequately by the system of my co-pending application is the existence of an error component of acceleration which is caused by the curvature of the flight path of the vehicle. Unless the vehicle travels in a straight line there is a centripetal acceleration which is experienced by the vehicle and by the instruments which are affixed thereto. These instruments, of course, cannot distinguish between the various accelerations to which they are subjected and, thus, the curvature of the flight path introduces a heretofore uncorrected error.

Accordingly, it is an object of this invention to eliminate certain acceleration sensing errors from a vehicle fixed guidance system without requiring either the complexity of computation of all errors or the gimbaling of the sensitive instruments to effect isolation thereof from the motion of the supporting vehicle.

In carrying out the invention in accordance with a preferred embodiment thereof as applied to the longitudinal guidance and control of a vehicle adapted to travel along a curved path, there are provided program means for generating a predicted signal representative of centripetal acceleration which the vehicle would experience when traveling precisely along a programmed course. An acceleration sensitive device fixed to the vehicle is employed for providing a measured signal representative of the actual vehicle acceleration radially of said path. The difference between the predicted centripetal acceleration and the measured or actual vehicle acceleration provides an indication of accelerations other than those predicted. Such accelerations are due to departures of the vehicle from programmed path as may be caused by wind, thrust variations and other disturbances. Thus, this difference between predicted and actual radial acceleration may be utilized to derive a control signal component to correct for deviations of the vehicle from its nominal path. In the illustrated embodiment of the invention the corrections and measurements are made for those accelerations which are substantially normal to the vehicle velocity.

It is an object of this invention to provide an inertial guidance system utilizing vehicle fixed instruments which are corrected in a simplified manner.

It is another object of this invention to minimize the errors due to centripetal acceleration sensed by vehicle fixed instruments.

Still another object of the invention is the provision of a guidance system in which the gimbaled platform with all its complexities and disadvantages is eliminated with a minimum increase in complexity of electronics and a minimum degradation of accuracy.

These and other objects of the invention will become apparent from the following description taken in connection with the accompanying drawings in which.

Figure 1:
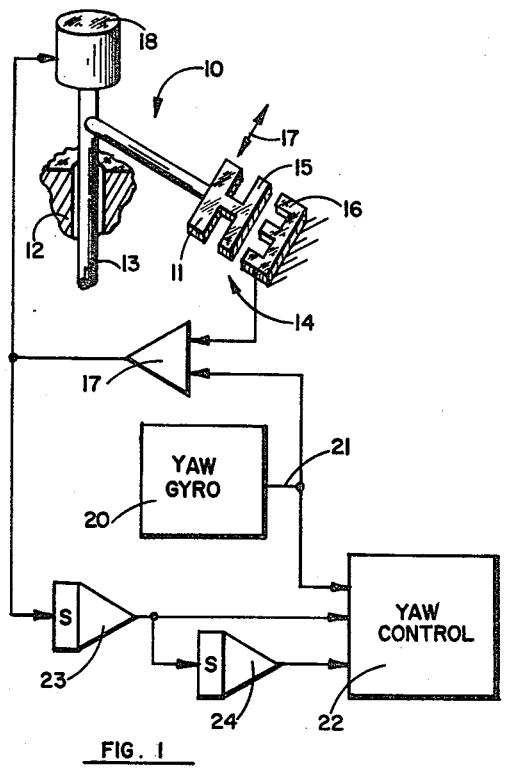
FIG. 1 illustrates part of a lateral guidance and control system.

FIG. 5 comprises an illustration of the longitudinal guidance and control of a vehicle according to a preferred mechanization of the principles of this invention.

In the drawings like reference numerals refer to like parts.

The arrangement and mechanization to be described herein is most readily adapted for control of a ballistic missile of short to medium range. The guidance system is based upon the use of three accelerometers which, while mounted directly to the frame of the vehicle, are effectively isolated from substantial deviations of the vehicle from the predicted vehicle attitude. The accelerometers are isolated as is more particularly described in the aforementioned co-pending application Serial No. 730,753. Each accelerometer is servoed to align itself with the appropriate gyro orientation and has a sensing axis which is mutually orthogonal with respect to the other two sensing accelerometers. The term accelerometer as utilized herein includes those instruments which are sensitive to acceleration and provide outputs, whether by means of internal or external integration, which represent either acceleration, velocity or distance.

The lateral accelerometer which senses accelerations along the pitch axis of the vehicle is referenced to the yaw gyro. The longitudinal and normal accelerometers which sense accelerations along the roll and yaw axes respectively are both referenced to the pitch gyro although their sensitive axes are mutually perpendicular.

The accelerometer and gyro arrangement is substantially the same as that described in my above-mentioned co-pending application Serial No. 730,753. For lateral control of the vehicle as illustrated in FIG. 1, there is provided a lateral accelerometer 10 which is of the force balance type, a type well known to those skilled in the art. Typical pendulous force balance accelerometers are illustrated in application Serial No. 615,629, now Patent No. 2,964,949, of D. E. Wilcox for Induction Velocity Meter filed October 12, 1956, and an application Serial No. 536,686, now Patent No. 3,122,022, of J. M. Wuerth et al. for Improved Accelerometer and Integrator filed September 23, 1955. As schematically illustrated in FIG. 1, the accelerometer comprises a pendulous proof mass 11 mounted to the vehicle, or some suitable support 12 affixed thereto, for pivotal motion about the axis of a supporting shaft 13 which coincides with the yaw axis of the craft. The accelerometer embodies a pickoff 14 including a part 15 secured to the proof mass 11 and a part 16 which is affixed to the accelerometer support 12. Upon experiencing acceleration in the direction of the arrow 17 (along the pitch axis of the vehicle), the proof mass deflects, tending to rotate about its journal, thus providing an output signal from the pickoff 14 which is fed through control circuit 17 to a torquer 18 which exerts a force acting about the journal of the proof mass in a direction tending to null the deflection sensed by the pickoff. The signal at the output of the control circuit 17 is thus proportional to the sensed acceleration. The accelerometer may be made to provide an output directly proportional to acceleration or may be provided with means for effecting internal integration of the acceleration signal so as to provide an output indicative of velocity. In the arrangement schematically shown in FIG. 1, the output is proportional to acceleration.

A conventional yaw gyro 20 is fixed to the craft and provides an output on lead 21 which is indicative of displacement of the craft about its yaw axis with respect to the reference established by the gyro. This signal is fed, together with the output of pickoff 14, into the control circuitry 17 which algebraically combines the two inputs thereto. If the inputs are of alternating current and the utilization circuitry, such as the torquer 18, is of the direct-current type, the control circuit 17 will also incorporate a conventional demodulator. Of course, the control circuit will additionally provide suitable amplification as deemed necessary or desirable.

The above described arrangement, as detailed in my co-pending application Serial No. 730,753, operates, in effect, to displace the null position of the proof mass 11 in accordance with the vehicle perturbation as sensed by the yaw gyro 20 whereby the proof mass is servoed to remain aligned with the gyro. As the vehicle is perturbed or rotates to a small extent about its yaw axis, the gyro, which remains angularly fixed in space, is displaced relative to the vehicle. Similarly, by means of the described circuitry the proof mass of the accelerometer is displaced in yaw relative to the vehicle whereby the proof mass remains aligned with the reference direction established by the gyro. This direction will be the desired azimuth of the vehicle trajectory in this situation.

Yaw control of the vehicle is achieved by conventional yaw control apparatus 22 which is operated in accordance with the sum of three input signals thereto. The first of such signals is the yaw displacement comprising the output of the gyro 20. The other two inputs to the yaw control apparatus 22 comprise the first and second integrals of sensed lateral acceleration, that is, lateral velocity and lateral displacement which are computed from the output of the accelerometer 10 by means of first and second integrators 23 and 24. With this arrangement the actual vehicle path is controlled so as to depart very little from the predicted path in the lateral direction.

The pitch guidance and control is essentially similar to the lateral guidance or control for the described embodiment. This apparatus is arranged for application to a vehicle which is to be flown along a straight azimuth path with no lateral programmed deviation, but on a curved pitch path. The illustrated embodiment is designed for a situation wherein a vehicle will be launched vertically or at some elevation angle which is substantially larger than the flight path angle required at termination of boost of the vehicle. A pitch attitude programmer provides a series of precision signals to drive the pitch gyro through a carefully preselected program as described below. The flight control system directs the vehicle airframe toward conformity with the pitch gyro unless commanded otherwise by the guidance computer.

By employing a number of empirical computer runs for different pitch angle programs, there may be selected a pitch attitude program which can successfully use virtually constant angles of attack over almost the entire trajectory. Two very short intervals of time will occur in which the angle of attack will not remain constant but, in both of these instances, the rate of change of the angle of attack will be known with a reasonable degree of accuracy. These exact conditions exist only for an ideal vehicle under conditions of no wind, average atmosphere and nominal thrust-time program. Consequently, deviations from the predicted program will indicate variations in these and possibly other areas.

The complete powered trajectory of a ballistic vehicle will consist of three distinct phases. At launch a straight line flight path will be programmed for a short time to permit launching transients to decay and to obtain stable control. Second, a curved flight path nominally maintaining a constant angle of attack is programmed until the desired flight path angle is obtained. Lastly, a straight line flight path is achieved for as long as required until cut off.

During the first flight phase the pitch gyro will hold a constant reference of substantially 90 degrees with respect to the horizontal. For this condition both the vehicle attitude and flight path angle will coincide with each other and the reference. Consequently, the angle of attack will remain constant at zero degrees.

At the beginning of the second flight phase the pitch gyro is rapidly driven or torqued over for a short time at a known rate to establish a small negative angle of attack which is then maintained virtually constant for more than half of the boost period. Then the pitch gyro is further driven or torqued over in a series of steps in each of which the torquing rate is held constant, each step providing a slower torquing rate than the preceding one.

Figure 4:
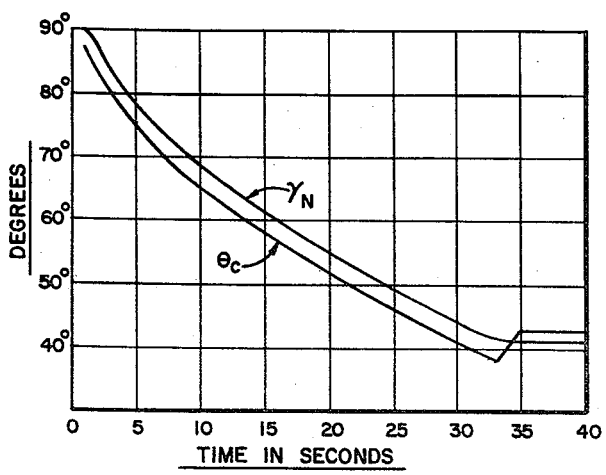

At such time as the flight path angle is predicted to be nearly that for cut-off, the pitch gyro is torqued rapidly in a positive direction until it attains the predicted vehicle attitude at which cut-off occurs. This maneuver is the beginning of the third flight phase in which the pitch gyro reference is held constant until cut-off occurs. To improve an already good accuracy in this third phase, it may be desirable to torque the pitch gyro to a slightly more positive angle and then allow it to decrease very slowly in one or more steps to the final value. This program of pitch gyro torque command is inserted into and carried in the programmer. Investigation has determined that an exemplary pitch angle program will permit use of an angle of attack, $\alpha=0°$ from launch until one second thereafter, $\alpha=-3°$ from 1 to 33 seconds and $\alpha=+2°$ from 33 seconds to end of boost. Such a program for nominal flight path and pitch angle is depicted in FIG. 4.

Figure 2:
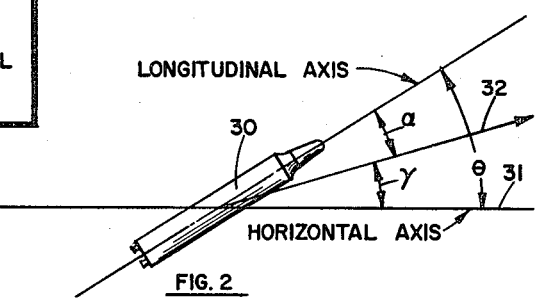

The advantages to be derived from the use of a constant angle of attack will be explained with the aid of the following equations based upon zero wind conditions and the geometry illustrated in FIGS. 2 and 3. In these equations $\sigma$ is the pitch angle of the vehicle 30 with respect to a horizontal reference line 31. $\gamma$ is the vehicle flight path angle, between the vehicle velocity vector 32 and the horizontal 31. $\alpha$ is the angle of attack, between the roll axis of the vehicle and its velocity vector. From an inspection of FIG. 2 it is obvious that $$\sigma=\gamma+\alpha \qquad (1)$$
$$\sigma=\gamma+\alpha \qquad (2)$$

During the curved portion of the flight the programmer provides for a commanded pitch angle and the angle of attack is virtually constant. Therefore, $\dot{\alpha}=0$ and $\dot{\sigma}=\dot{\gamma}$. Thus where $\dot{\sigma}$ is known and of controlled magnitude $\dot{\gamma}$ is also known. This value of $\dot{\gamma}$ is used for compensating forces concomitant with the curved flight path; that is, this quantity is utilized to compute centripetal acceleration of the vehicle along its predicted flight path.

If the vehicle follows a predicted nominal trajectory, normal acceleration (normal to the vehicle velocity vector) is given by $$a_P = V\dot{\gamma}_P - g \cos \gamma_P \qquad (3)$$

By substituting equivalent parameters $$a_P = V\dot{\sigma}_c - g \cos (\sigma_c - \alpha) \qquad (4)$$

where: $a$ is acceleration normal to the flight path, $V$ is velocity along the flight path, $g$ is gravity, subscript P denotes predicted, and subscript $c$ denotes commanded.

Equation 4 is composed of known parameters whereby it becomes possible to continuously compute a predicted value of normal acceleration. In accordance with the embodiment of the invention described herein, the difference between this predicted acceleration and the actual normal acceleration as measured by the normal accelerometer is employed to control the vehicle along its programmed pitch path. This difference is caused by disturbances which tend to move the vehicle from its predicted pitch path. These disturbances are attributed to wind, thrust variations and the like.

As illustrated in FIG. 5, there is provided a programmer 35, schematically illustrated, which includes a constant speed motor 36 driving a rotatable cam 37 having the periphery thereof cut in accordance with the desired variation of the quantity which is programmed thereby. Cam 37 is cut in accordance with the nominal predicted value of the angle of attack $\alpha_N$. The cam 37 drives a cam follower 38 which operates the wiper of a potentiometer 39. From the wiper of this potentiometer there is obtained the programmed value of $\alpha_N$. The programmer 35 further includes a number of additional cams and potentiometers (not shown) driven by the same motor 36 which are so arranged so as to provide signals representing the programmed value of quantities $\dot{\sigma}_c$, $g \sin \sigma_c$ and $g \cos \gamma_N$ where $\gamma_N$ is the predicted or nominal flight path angle.

A longitudinal accelerometer 40 is fixedly secured to the vehicle, as are all of the other accelerometers, but has its sensitive axis aligned with the longitudinal or roll axis of the vehicle. The accelerometer which may be identical except for orientation with the other accelerometers described herein includes a pickoff 41 and torquer 42 which are interconnected to provide a force balance instrument by means of control circuit 43.

Similarly, a normal accelerometer 45 having a pickoff 46 and a torquer 47 interconnected by control circuit 48 is fixedly secured to the vehicle with its sensitive axis along the yaw axis so as to sense accelerations normal to the longitudinal axis of the vehicle.

For the purpose of internally stabilizing these accelerometers as described in my co-pending application Serial No. 730,753, there is provided a pitch gyro 50 which affords a stable reference about the pitch axis of the vehicle. It is to be noted that the proof mass elements of each of the longitudinal and normal accelerometers 40, 45 are journaled about axes parallel to the vehicle pitch axis. The gyroscope 50 provides an output signal which is a measure of the angular displacement or perturbation of the vehicle about the pitch axis indicated in the drawing by the numeral 51. This axis is the input axis of the gyroscope. This gyroscope is utilized to angularly shift the proof mass of the accelerometers 40 and 45 about their pivot axes in an amount and direction such that the sensitive axes of the accelerometers will remain aligned with the space fixed axes in the absence of further inputs to the accelerometers which will be explained hereinafter.

The gyroscope 50 comprises a rotor element 52 which is rotated in an inner gimbal 53. Inner gimbal 53 is pivotally mounted about the output axis normally perpendicular to both input and rotor spin axes in an outer gimbal 54 which is pivoted about the pitch input axis to the vehicle or a support 55 fixed thereto. The fixed mountings for the several gyros and acceleration sensitive instruments are all fixed to each other and to the vehicle. Output axis precession of the gyro is sensed by a pickoff 56 which detects rotation of gimbal 53 relative to gimbal 54 about the output axis. This pickoff feeds a signal through a control amplifier 57 to an input axis torquer 58 to achieve stabilization of the gyro input axis in space. The gyro is provided with an input axis pickoff 70, which includes a part 71 fixed to the outer gimbal 54 and a part 72 which is mounted to the vehicle for rotation about an axis coinciding with the axis of rotation of outer gimbal 54. Thus, upon rotation of the vehicle about the input axis of the gyro and in the absence of rotation of the pickoff part 72 relative to the airframe, there is provided a pickoff signal which is proportional to the magnitude of such rotation of the vehicle in pitch.

For programming of the pitch reference angle which is defined by the pitch gyro 50, the pickoff part 72 is driven by a motor 73 in accordance with the commanded pitch angle $\sigma_c$. Thus, when an angle $\sigma_c$ is introduced into the pickoff by means of motor 73, the pickoff part 72 moves relative to the part 71 and the pickoff output signal is provided which is proportional to the difference between the commanded pitch angle $\sigma_c$ and the pitch angle $\sigma$ sensed by the gyro. The output of the gyro from pickoff 70 is thus the commanded pitch angle which is utilized to control the vehicle, as will be described hereinafter.

Another of the program quantities is predicted pitch angle rate $\dot{\sigma}_c$. It is this quantity $\dot{\sigma}_c$ which when integrated in an integrator 69 provides the commanded pitch angle $\sigma_c$ to the pitch programmer motor 73. It is to be understood that the illustrated arrangement of the pitch angle programming is merely exemplary of several types of pitch programming which may be employed. Thus, where an integrating pitch gyro is desired to be programmed by use of its torquer, a current proportional to the commanded pitch rate $\dot{\sigma}_c$ may be fed directly to the torquer of the gyro whereby the gyro when integrating this input will provide an output precession angle proportional to the integral of commanded pitch rate.

As described above, the output of the pitch gyro comprises an error signal representing the pitch deviation of a vehicle from a commanded reference defined by the gyroscope. This pitch deviation is imparted to each of the accelerometers 40 and 45 because of their attachment to the vehicle. Therefore, in accordance with the principles of my co-pending application Serial No. 730,753, this pitch angle deviation is fed as a correcting input to the circuitry of each of the accelerometers 40 and 45. It will be noted, however, with reference to FIG. 2, that the sensing axis of the longitudinal accelerometer 40 which is aligned with the longitudinal axis of the vehicle is misaligned with respect to the vehicle velocity vector by the angle of attack $\alpha$. Similarly, the sensitive axis of the normal accelerometer 45 is misaligned with respect to the normal velocity vector by the angle of attack $\alpha$. Thus, these accelerometers must not only be corrected for the pitch error angle $\sigma_c - \sigma$, but must additionally be corrected for the angle of attack $\alpha$ since it is the actual vehicle velocity which is utilized. To this end the pitch error angle $\sigma_c - \sigma$ is added to the programmed value of the nominal angle of attack $\alpha_N$ in a summing network 75. The output of this summing network is fed as a second input to each of the control circuits 43 and 48 of the longitudinal and normal accelerometers 40 and 45 whereby these are corrected for the stated angular relations.

An accelerometer, of course, cannot distinguish among the several accelerations which it experiences, and thus frequently an instrument which is to measure velocity is mounted on a horizontal stable platform whereby it will be insensitive to gravity. Such an arrangement, of course, is not possible where the instruments are fixed to the vehicle. Accordingly, the programmer produces a signal $g \sin \sigma_c$ which is representative of the predicted component of gravity. This signal is fed to the control circuit 43 of the longitudinal accelerometer 40 to provide a second correction component for this instrument. The output of longitudinal accelerometer 40, in the nonintegrating instrument illustrated, is thus proportional to the vehicle acceleration along the velocity vector 32 illustrated in FIG. 2. This vehicle acceleration is integrated in an integrator 76 to yield the desired vehicle velocity. The velocity signal is compared in a comparator 77 with a signal representing a predetermined velocity cut-off. When the comparator 77 indicates equality between the commanded velocity cut-off and the measured velocity a signal is fed to thrust control mechanism 78 to stop the vehicle propulsion.

In order to provide the predicted value of normal acceleration, the centripetal acceleration due to the predicted quantities must be computed. To this end the measured vehicle velocity which is derived from the longitudinal accelerometer is multiplied in a multiplier 80 by the programmer output which represents the commanded pitch rate $\dot\sigma_c$. Thus, the output of multiplier 80 comprises the product $V\dot\sigma_c$ which is the centripetal acceleration component, the predicted normal acceleration. To this component is added the normal component of gravity, a term also derived from the programmer, as $g \cos \gamma_N$. These two quantities are added in a summing network 81 to provide the predicted normal acceleration $a_N$.

The measured normal acceleration $a_n$ appears as a signal at the output of the control circuit 48 of normal accelerometer 45. The measured value $a_n$ differs from the predicted $a_N$ by an amount determined by what may be termed error accelerations, that is, the accelerations the vehicle experiences in the course of departure from its programmed pitch path. These accelerations vary as illustrated in FIG. 3. The difference is obtained in a further summing network 82 wherein the algebraic sum of the two inputs $a_n$ and $a_N$ is achieved by appropriate use of signals of proper polarity. The output of this summing network 82 may be termed the normal acceleration error $\ddot Z$. This acceleration error is integrated twice in integrators 83 and 84 to provide normal velocity and displacement error signals $\dot Z$ and $Z$ respectively. The normal velocity and displacement errors $\dot Z$ and $Z$ are combined in a summing network 85 of which the output is fed to a further summing network 86 which has as a second input thereto the pitch error signal $\sigma_c-\sigma$ as derived from the output pickoff 70 of the pitch gyro 50. The output of summing network 86 is combined with the output of a pitch rate gyro 87 in a summing network 88. The output of summing network 88 is fed to a pitch control servo 89 having a position pickoff 90 which feeds back to an input summing network 91. Servo 89 is connected to operate the vehicle pitch control mechanism which may be aerodynamic surfaces, jet vanes, swiveled motors, jetovators, or the like.

Thus, it will be seen that for pitch control of a vehicle there is a rate stabilization provided by pitch rate gyro 87. Pitch attitude control is provided directly from the displacement gyro 50 which measures the angular deviation in pitch of the vehicle from the command pitch attitude, and, further, velocity and displacement control components are provided in accordance with normal error accelerations which are experienced during departure of the vehicle from its programmed path. It is to these latter two components, normal velocity error and normal displacement error, that the novel aspects of the described embodiment are most particularly directed. For computation of these normal error components in a system utilizing vehicle fixed instruments, it is necessary to account for accelerations due to curvature of vehicle path and eliminate these from the measurements. Thus, according to the described embodiment of the invention, a predicted centripetal acceleration is compared with a measured centripetal acceleration whereby the difference represents the desired normal acceleration error.

Figure 3:
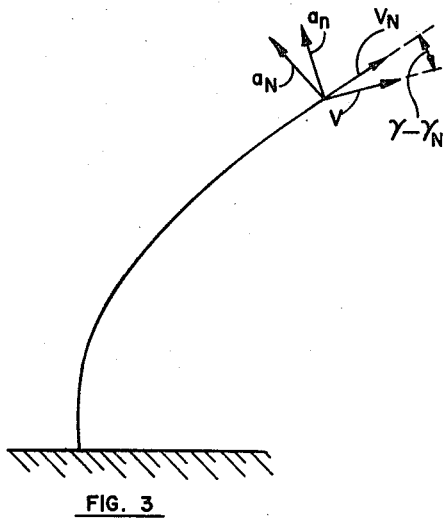
FIGS. 2, 3 and 4 illustrate certain angular relations of significance.

With reference to FIG. 3 it will be seen that the vehicle flying along its programmed trajectory will have a nominal velocity vector $V_N$ and a predicted or nominal normal acceleration $a_N$. However, due to the variations in thrust from predicted value, variations in wind and other facts tending to cause the vehicle to deviate from its programmed path, the vehicle velocity vector actually will be as represented by the vector V which has an angular relation with respect to the nominal velocity of $\gamma - \gamma_N$. Thus, it will be seen that with this angular deviation of actual velocity vector from the nominal velocity vector, the nominal normal acceleration $a_N$ will deviate from the actual normal acceleration $a_n$. It is this difference, the difference between $a_N$ and $a_n$, which is accounted for by the described structure including summing network 82 and integrators 83 and 84, despite the fact that the vehicle is on a curved path and experiences centripetal accelerations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a vehicle adapted to travel along a predetermined curved trajectory, pitch attitude control mechanism, program means for operating said mechanism so as to cause said vehicle to proceed with a selected attitude program, means for generating a predicted normal acceleration signal representing radial acceleration forces due to curvature of the trajectory, said last-mentioned means including vehicle fixed accelerometer means for providing a vehicle velocity signal and means for multiplying the velocity signal by a programmed signal equivalent to flight path angle rate, accelerometer means for generating a measured normal acceleration signal indicative of actual vehicle acceleration along a radius of curvature of its trajectory, and means responsive to the difference between said predicted and measured acceleration signals for supplying a control signal component to said mechanism so as to decrease departure of said vehicle from said predetermined trajectory.

2. In a vehicle adapted to travel along a predetermined curved trajectory, pitch attitude control mechanism, program means for operating said mechanism so as to cause said vehicle to proceed with a selected attitude program, means for generating a predicted normal acceleration signal representing radial acceleration forces due to curvature of the trajectory, said last-mentioned means including vehicle fixed accelerometer means for providing a vehicle velocity signal and means for multiplying the velocity signal by a programmed signal equivalent to flight path angle rate, a programmed pitch gyro, means responsive to said gyro for correcting said accelerometer means according to gravity, angle of attack and pitch deviation of the vehicle, accelerometer means for generating a measured normal acceleration signal indicative of actual vehicle acceleration along a radius of curvature of its trajectory, and means responsive to the difference between said predicted and measured acceleration signals for supplying a control signal component to said mechanism so as to decrease departure of said vehicle from said predetermined trajectory.

3. In combination with a vehicle adapted to be controlled along a curved path, longitudinal guidance apparatus comprising: means for generating a predicted signal representative of vehicle centripetal acceleration, said means including a programmer providing a programmed pitch rate signal, acceleration sensitive means for providing a vehicle velocity signal, and a multiplier responsive to said pitch rate and velocity signals; an acceleration sensitive device providing a measured signal representative of actual vehicle acceleration radially of said path; and means for deriving a vehicle control signal component in accordance with the difference between said predicted and measured signals.

4. In combination with a vehicle adapted to be controlled along a path of predetermined curvature, longitudinal guidance apparatus comprising: means for generating a predicted signal representative of vehicle centripetal acceleration, said means including a programmer providing a programmed pitch rate signal, acceleration sensitive means for providing a vehicle velocity signal, and a multiplier responsive to said pitch rate and velocity signals; an acceleration sensitive device providing a measured signal representative of actual vehicle acceleration radially of said path; said programmer providing signals representing predetermined components of gravity and angle of attack; a pitch gyro connected to be programmed by said programmed pitch signal to provide a pitch error signal representing deviation of the vehicle from said path; means for biasing both said acceleration means and said acceleration sensitive device according to the sum of said angle of attack and pitch error signals; means for biasing said acceleration sensitive means according to a first one of said gravity component signals; means for combining said predicted signal representative of centripetal acceleration with another of said gravity component signals; and means for deriving a vehicle control signal component in accordance with the difference between said combined and measured signals.

5. A guidance system for a vehicle adapted to traverse a curved path comprising a programmer for generating signals respectively indicative of $g \cos \gamma_N$, $g \sin \sigma_C$, $\alpha_N$ and $\sigma_C$ where $g$ is gravitational acceleration, $\gamma_N$ is nominal flight path angle, and $\sigma_C$ is nominal pitch angle, a pitch gyro having a function of said programmed $\sigma_C$ signal as an input thereto and having a pitch position error signal output, a first acceleration sensitive device for generating a velocity signal representative of vehicle velocity along said path, a second acceleration sensitive device for generating an acceleration signal representative of vehicle acceleration along a radius of curvature of said path, each said acceleration sensitive device having a correction input comprising the sum of said $\alpha_N$ and pitch error signals, said first acceleration sensitive device having an additional correction input comprising said $g \sin \sigma_C$ signal, a multiplier responsive to said velocity and $\sigma_C$ signals, a summing network responsive to said multiplier and to said $g \cos \gamma_N$ signal, a second summing network responsive to said first mentioned summing network and said acceleration signal, said second summing network providing a normal acceleration vehicle control signal.

6. The system of claim 5 wherein each said acceleration sensitive device comprises a mass pivoted to the vehicle about the vehicle pitch axis, a pickoff for sensing pivoted motion of the mass, a torquer for restoring the mass to null position, and a control circuit connecting the pickoff and torquer, said correction inputs being applied to said acceleration sensitive devices as inputs to the control circuit thereof.

7. In a vehicle adapted to be guided along a predetermined curved path, a first vehicle fixed accelerometer for generating a velocity signal indicative of longitudinal velocity along said path, means for correcting said accelerometer in accordance with gravity, vehicle angle of attack and angular deviations of the vehicle in the plane of said path, a programmer for programming the angle of said path with respect to a reference direction, means responsive to said programmer and said first accelerometer for providing a predicted acceleration signal representing centripetal acceleration of the vehicle, a second vehicle fixed accelerometer for generating a measured acceleration signal indicative of actual vehicle acceleration normal the vehicle velocity vector, means for correcting said second accelerometer in accordance with vehicle angle of attack and said angular deviations, and means for comparing said measured and predicted acceleration signals.

8. In combination with a vehicle adapted to be controlled along a curved path, guidance apparatus comprising:
means for generating a predicted signal representative of vehicle centripetal acceleration;
an accelerometer providing a measured signal representative of actual vehicle acceleration radially of said path and comprising a mass pendulously mounted to said vehicle, feedback means for maintaining said mass in null position, and means for modifying the operation of said feedback means in response to angular deviation of said vehicle from said path for displacing said null position according to said deviation, said modifying means including means for modifying the operation of said feedback means in response to vehicle angle of attack; and
means for deriving a vehicle control signal component in accordance with the difference between said predicted and measured signals.

References Cited by the Examiner
UNITED STATES PATENTS

| 2,770,452 | 11/56 | Miller | 244—77 |
| 2,945,643 | 7/60 | Slater. | |
| 2,946,539 | 7/60 | Fischel | 244—14 |

FOREIGN PATENTS

| 817,673 | 8/59 | Great Britain. |

SAMUEL FEINBERG, *Primary Examiner.*
CHESTER L. JUSTUS, *Examiner.*